(12) United States Patent
Amels

(10) Patent No.: US 6,611,854 B1
(45) Date of Patent: Aug. 26, 2003

(54) SYSTEM AND METHOD FOR DISTORTING A SIGNAL

(76) Inventor: David Amels, 111 Tenth St., Wood Ridge, NJ (US) 07075

( * ) Notice: Subject to any disclaimer, the term of this patent is extended or adjusted under 35 U.S.C. 154(b) by 428 days.

(21) Appl. No.: 09/668,701

(22) Filed: Sep. 22, 2000

Related U.S. Application Data

(60) Provisional application No. 60/155,964, filed on Sep. 24, 1999.

(51) Int. Cl.$^7$ ................................................. G06F 17/10
(52) U.S. Cl. ........................................ 708/270; 708/300
(58) Field of Search .................................. 708/270, 300

(56) References Cited

U.S. PATENT DOCUMENTS

| | | | | | |
|---|---|---|---|---|---|
| 4,485,357 A | * | 11/1984 | Voorman | ..................... | 332/145 |
| 5,814,812 A | * | 9/1998 | Holzapfel | .............. | 250/231.16 |
| 5,838,210 A | * | 11/1998 | Midya et al. | ................ | 332/109 |

* cited by examiner

*Primary Examiner*—David H. Malzahn
(74) *Attorney, Agent, or Firm*—Ostrolenk, Faber, Gerb & Soffen, LLP

(57) ABSTRACT

The present invention employs a mapping function in order to apply a known distortion to an input signal. The mapping function of the present invention is defined by: $y = A1*\sin(\arcsin(x)) + A2*\cos(2*\arcsin(x)) + A3*\sin(3*\arcsin(x)) + A4*\cos(4*\arcsin(x)) + \ldots An*\sin(n*\arcsin(x)) + A(n+1)*\cos((n+1)*\arcsin(x))$, where x is the input signal, y is the output signal, A is the amplitude of the harmonic level for a given harmonic, 1 being the fundamental, n is an odd number and (n+1) represents the highest harmonic of interest.

16 Claims, 1 Drawing Sheet

SYSTEM AND METHOD FOR DISTORTING A SIGNAL

Figure 1:
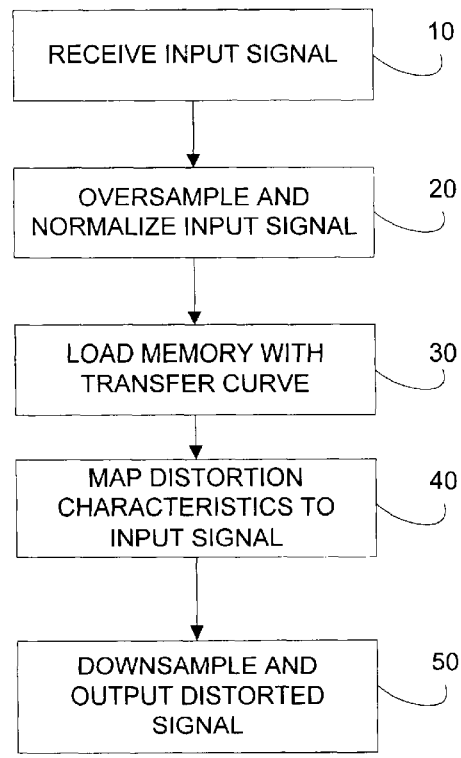

This application is based on and claims priority to provisional patent application Serial No. 60/155,964, filed Sep. 24, 1999 entitled SYSTEM AND METHOD FOR DISTORTING A SIGNAL, the entire contents of which are incorporated herein by reference.

FIELD OF THE INVENTION

The present invention generally relates to a system and method for distorting a signal and more particularly relates to a system and method for mapping a distortion characteristic to a signal.

BACKGROUND OF THE INVENTION

In the area of digital signal processing, particularly in the area of music signals, it is desirable to add a predetermined distortion to a signal. In the creating of digital models of old analog equipment, it is necessary to copy the particular equipment's distortion characteristics. The prior art has sought to accomplish this copying by applying transfer curves either derived empirically by trial and error or determined by a submodel of the active component creating the distortion. In a typical analog system, there may be many devices contributing to the distorted output therefore requiring many submodel to achieve the desired distortion characteristics.

U.S. Pat. No. 5,789,689 to Doidic discloses an electric guitar amplifier which utilizes a digital signal processor to produce vacuum-tube-like distortion. U.S. Pat. No. 5,929,795 to Wang digitally processes a signal for reduced distortion and frequency deviation. The digital processing involves increasing the sampling frequency of a digital signal prior to a non-linear operating stage. The processed signal is then passed through a low pass filter prior to being down-converted to the initial sampling frequency.

SUMMARY OF THE INVENTION

It is an object of the present invention to provide a system and a method for distorting an input signal. It is desirable to obtain distorted audio signals in the audio or visual recording studio to simulate various parts of the recording signal chain such as recording machines and outboard effect devices. The present invention has eliminated the trial and error and modeling techniques of the prior art as described above, and uses data obtained from the output spectra of the modeled device to create a transfer curve directly. The output spectra can be obtained readily from an analog unit under test through Fast Fourier Transform (FFT) analysis.

The present invention employs a mapping function in order to apply a known distortion to an input signal. The transfer curve of the present invention is defined by: $y=A1*\sin(\arcsin(x))+A2*\cos(2*\arcsin(x))+A3*\sin(3*\arcsin(x))+A4*\cos(4*\arcsin(x))+An*\sin(n*\arcsin(x))+A(n+1)*\cos((n+1)*\arcsin(x))$, where x is the input signal, y is the output signal, A is the amplitude of the harmonic level for a given harmonic of the distortion, 1 being the fundamental, n is an odd number and (n+1) represents the highest harmonic of interest.

Other features and advantages of the present invention will become apparent from the following description of the invention which refers to the accompanying drawings.

BRIEF DESCRIPTION OF THE DRAWING(S)

Figure 2:
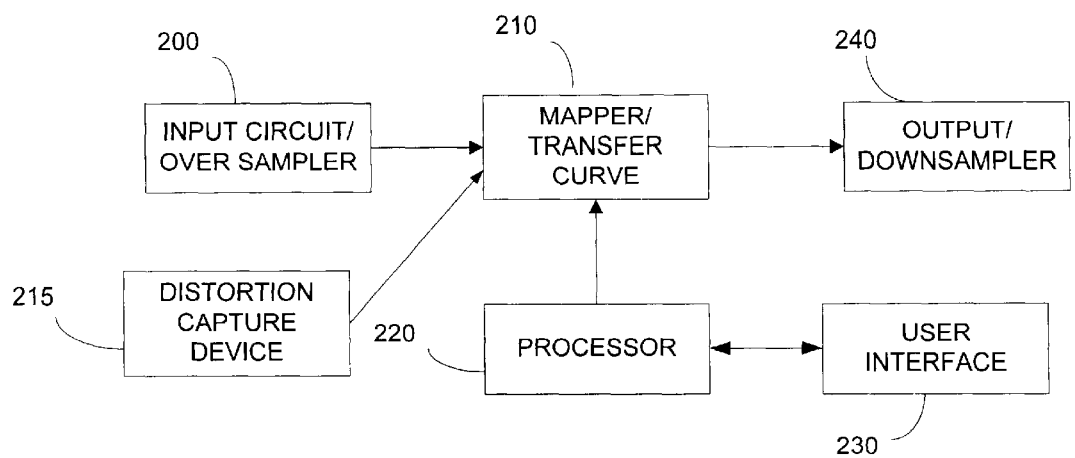

FIG. 1 illustrates a flowchart embodying the method of the present invention; and FIG. 2 depict an apparatus according to the present invention.

DETAILED DESCRIPTION OF EMBODIMENTS OF THE INVENTION

Exact harmonic modification of a control, audio, or video signal can be accomplished by application of a device utilizing a special mapping function. It is possible to match the known harmonic content of previously analyzed signals or generate new desirable changes to a signal's harmonic content using a device employing this function.

The spectrum of a distorted signal may be obtained by FFT analysis or other means. This spectrum, the distortion characteristic, is defined in terms of the number and relative levels of the harmonics of the distortion.

The mapping function, or transfer curve of the present invention takes an input signal x and applies the distortion characteristic to generate a distorted output signal y according to the following function: $y=A1*\sin(\arcsin(x))+A2*\cos(2*\arcsin(x))+A3*\sin(3*\arcsin(x))+A4*\cos(4*\arcsin(x))+\ldots An*\sin(n*\arcsin(x))+A(n+1)*\cos((n+1)*\arcsin(x))$, where A is the amplitude of the harmonic level for a given harmonic of the distortion, 1 being the fundamental, n is an odd number and (n+1) represents the highest harmonic of interest.

FIG. 1 illustrates a flowchart embodying the method of the present invention. This method can be a separate plug-in or embodied as an integral part of a digital signal processor (DSP) system. The hardware and operating systems employed by DSP systems is well known to those skilled in the art. One well known DSP is the Motorola 56002 DSP.

In step 10, the input signal which is to be distorted is received. In step 20, the input signal is normalized to a value between −1 and +1. In step 30 a memory is loaded with an transfer curve (the distortion characteristics) for application to the signal processed in step 20.

In step 40, the distortion characteristics are applied to the normalized input signal in order to generate the distorted output signal which is output in step 50. As previously described, the function used to apply the distortion to the input signal x to obtain the distorted output signal y is defined by: $y=A1*\sin(\arcsin(x))+A2*\cos(2*\arcsin(x))+A3*\sin(3*\arcsin(x))+A4*\cos(4*\arcsin(x))+\ldots An*\sin(n*\arcsin(x))+A(n+1)*\cos(n+1))*\arcsin(x))$, where x is the input signal, y is the distorted output signal, A is the harmonic level for a given harmonic, 1 being the fundamental, n is an odd number and (n+1) represents the highest harmonic of interest. The distorted output signal is downsampled in step 50 to eliminate aliasing.

In a preferred embodiment, the distortion characteristics are obtained beforehand and stored in a memory for quick retrieval as illustrated in the loading of step 30. Alternatively, if the same distortion characteristics are repeatedly used, they can be hard coded into the DSP system. In an example of obtaining a distortion characteristic, a 1 KHz sine wave generator is connected into an unknown distortion device to be modeled. The spectra of the output signal of the unknown distortion device is then measured using an FFT technique. The measured distortion characteristics are represented by the number and relative levels of the harmonics of the distortion. The sine wave generator and the processor for applying the FFT technique can be part of a single distortion characteristic capture device.

FIG. 2 depicts an apparatus constructed according to the present invention. As with respect to the method described in regard to FIG. 2, the apparatus of FIG. 2 can be a separate or a component part of a digital signal processor (DSP). The hardware and operating systems employed by DSP systems is well known to those skilled in the art as described above. Element 200 is an input for receiving the input signal that is to be distorted. In a preferred embodiment, the input circuit 200 normalizes the input signal to a value between −1 and +1 and oversamples the signal.

Element 210 is the mapping element which applies the mapping function to the input signal. In a preferred embodiment, the mapper 210 is in the form of a memory which contains the desired transfer curve. The memory 210 is loaded from a suitable processor 220 which uses the following function to apply the transfer curve to the input signal: $y = A1*\sin(\arcsin(x)) + A2*\cos(2*\arcsin(x)) + A3*\sin(3*\arcsin(x)) + A4*\cos(4*\arcsin(x)) + \ldots An*\sin(n*\arcsin(x)) + A(n+1)*\cos((n+1)*\arcsin(x))$, where x is the input signal, y is the distorted output signal, A is the amplitude of the harmonic level for a given harmonic, 1 being the fundamental, n is an odd number and (n+1) represents the highest harmonic of interest.

Element 215 illustrates a distortion characteristic capture device as described above. The distortion capture device 215 loads the transfer curve into the memory 210. Alternatively, a user interface 230 may be employed which allows the direct entry of harmonic information into the processor. The distorted output signal is the downsampled by an output filter 230 in order to remove any harmonic content which might cause aliasing.

The digital device illustrated in FIG. 2 modifies a digitized analog signal in the same way that the prior art analog box does, at least with regards to distortion, in a much quicker, direct and efficient manner. Furthermore, the digital techniques of the present invention are far superior to the analog techniques of the prior art. The capture of the distortion characteristics according to the present invention is quick and accurate, and the DSP can be quickly reprogrammed to apply any transfer curve that has been captured. In the analog world, a new separate device must be used to apply a different distortion. As appreciated by those skilled in the art, other processing may be applied to the aforementioned analog signal, such as filtering and modulation, as is required to emulate the device being modeled.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus for creating a desired distortion characteristic in an input signal, the apparatus comprising:

an input circuit receiving the input signal, the input signal being denoted as x;

a memory containing the distortion characteristic defined in terms of a number of harmonics and relative levels of the harmonics;

a processor coupled to the input circuit and coupled to the memory, the processor applying the distortion characteristic to the input signal x to produce a distorted output signal y, wherein $y = A1*\sin(\arcsin(x)) + A2*\cos(2*\arcsin(x)) + A3*\sin(3*\arcsin(x)) + A4*\cos(4*\arcsin(x)) + \ldots An*\sin(n*\arcsin(x)) + A(n+1)*\cos((n+1)*\arcsin(x))$, where A is the amplitude of the harmonic level for a given harmonic, 1 being the fundamental, n is an odd number and (n+1) represents the highest harmonic of interest.

2. The apparatus of claim 1, wherein the input circuit normalizes the input signal.

3. The apparatus of claim 2, wherein the input circuit normalizes the input signal to the range of −1 to +1.

4. The apparatus of claim 1, wherein the input circuit oversamples the input signal.

5. The apparatus of claim 1, wherein the input circuit, the processor and the memory are part of a Digital Signal Processor.

6. The apparatus of claim 1, further comprising a distortion characteristic capture device for capturing the distortion characteristics.

7. The apparatus of claim 6, wherein the distortion characteristic capture device uses a Fast Fourier Transform to capturing the distortion characteristics.

8. The apparatus of claim 1, further comprising an output filter coupled to the processor.

9. The apparatus of claim 8 wherein the output filter downsamples the distorted output signal generated by the processor.

10. A method for creating a desired distortion characteristic in an input signal, the method comprising:

determining the desired distortion characteristic in terms of a number of harmonics and relative levels of the harmonics of the distortion characteristic;

receiving the input signal denoted as x;

applying the desired distortion characteristic to the input signal x to produce a distorted output signal y according to the following transfer function: $y = A1*\sin(\arcsin(x)) + A2*\cos(2*\arcsin(x)) + A3*\sin(3*\arcsin(x)) + A4*\cos(4*\arcsin(x)) + \ldots An*\sin(n*\arcsin(x)) + A(n+1)*\cos((n+1)*\arcsin(x))$, where A is the amplitude of the harmonic level for a given harmonic, 1 being the fundamental, n is an odd number and (n+1) represents the highest harmonic of interest.

11. The method of claim 10, further comprising normalizing the input signal.

12. The method of claim 11, wherein the act of normalizing the input signal further comprises normalizing the input signal to the range of −1 to +1.

13. The method of claim 10, further comprising the act of oversampling the input signal.

14. The method of claim 10, wherein the act of determining the desired distortion characteristic further comprises capturing spectra data representing the distortion characteristic.

15. The method of claim 14, wherein the act of determining the desired distortion characteristic further comprises using a Fast Fourier Transform on the spectra data to generate the distortion characteristic.

16. The method of claim 10, further comprising the act of downsampling the distorted output signal.

* * * * *